(12) United States Patent
Ghosh et al.

(10) Patent No.: US 8,989,112 B2
(45) Date of Patent: Mar. 24, 2015

(54) EICIC CARRIER AGGREGATION USING EXTENSION CARRIERS

(75) Inventors: Amitava Ghosh, Buffalo Grove, IL (US); Rapeepat Ratasuk, Hoffman Estates, IL (US)

(73) Assignee: Nokia Siemens Networks Oy, Espoo (FI)

( * ) Notice: Subject to any disclaimer, the term of this patent is extended or adjusted under 35 U.S.C. 154(b) by 337 days.

(21) Appl. No.: 13/457,809

(22) Filed: Apr. 27, 2012

(65) Prior Publication Data

US 2013/0286952 A1 Oct. 31, 2013

(51) Int. Cl.
H04W 24/00 (2009.01)
H04W 72/00 (2009.01)
H04W 24/10 (2009.01)

(52) U.S. Cl.
CPC .............. *H04W 72/00* (2013.01); *H04W 24/10* (2013.01)
USPC ............ 370/329; 370/252; 370/241; 370/392

(58) Field of Classification Search
CPC ... H04W 24/10; H04W 48/08; H04W 72/082; H04W 92/20; H04W 16/24; H04W 84/045; H04L 5/0091; H04L 1/0031; H04L 1/1854
USPC .................................. 370/329, 252, 241, 392
See application file for complete search history.

(56) References Cited

U.S. PATENT DOCUMENTS

| | | | |
|---|---|---|---|
| 5,963,869 A | 10/1999 | Fehnel | 455/511 |
| 8,280,389 B1 * | 10/2012 | Turtinen et al. | 455/450 |
| 2009/0239535 A1 | 9/2009 | Chun et al. | 455/435.2 |
| 2010/0029274 A1 | 2/2010 | Deshpande et al. | 455/435.3 |
| 2010/0331030 A1 | 12/2010 | Nory et al. | 455/509 |
| 2011/0170496 A1 * | 7/2011 | Fong et al. | 370/329 |
| 2011/0312328 A1 * | 12/2011 | Choi et al. | 455/450 |
| 2012/0020241 A1 | 1/2012 | Larsson et al. | 375/260 |
| 2012/0063321 A1 * | 3/2012 | Chandrasekhar et al. | 370/241 |

(Continued)

FOREIGN PATENT DOCUMENTS

| | | | | |
|---|---|---|---|---|
| WO | WO 2011015223 A1 * | 2/2011 | | 455/501 |
| WO | WO 2011/053974 A1 | 5/2011 | | |
| WO | WO 2011/085192 A1 | 7/2011 | | |

OTHER PUBLICATIONS

3GPP TSG-RAN WG1#54Bis; R1-083491; NEC Group; "Downlink Control Structure for Carrier Aggregation Approach in LTE-Advanced System"; Prague, Czech Republic, Sep. 29-Oct. 3, 2008 (4 pages).

(Continued)

*Primary Examiner* — Dang Ton
*Assistant Examiner* — Sai Aung
(74) *Attorney, Agent, or Firm* — Harrington & Smith

(57) ABSTRACT

A first BS transmits a first set of aggregated carriers including a PCC having a first carrier frequency and an SCC having a second carrier frequency. Contemporaneously, a second BS transmits a second set of aggregated carriers including a PCC having the second carrier frequency and an SCC having the first carrier frequency. In one aspect, the first BS transmits on the SCC a subframe having a number of selected symbols of the subframe at a lower power than other symbols of the subframe, the selected symbols aligning at least in part with a number of symbols of a control region of a subframe transmitted by the second BS on the PCC having the second carrier frequency. In another aspect, a UE attached to the second BS receives at least control information on the PCC of the first BS and receives data on the PCC of the second BS.

22 Claims, 9 Drawing Sheets

(56) References Cited

U.S. PATENT DOCUMENTS

2012/0149413 A1* 6/2012 Pedersen ............... 455/501
2013/0094456 A1* 4/2013 Ng ........................ 370/329
2013/0182583 A1* 7/2013 Siomina et al. ......... 370/252
2014/0003271 A1* 1/2014 Abe et al. ............... 370/252
2014/0086189 A1* 3/2014 Takeda et al. .......... 370/329

OTHER PUBLICATIONS

3GPP TSG-RAN WG3 #75bis; R3-120809; Qualcomm Incorporated (rapporteur); "DL Interference solution description for Carrier Based HetNet"; San Jose del Cabo, Mexico, Mar. 26-30, 2012 (5 pages).

Lopez-Perez, D., et al., "Enhanced Intercell Interference Coordination Challenges in Heterogeneous Networks", IEEE Wireles Communications, Jun. 2011, pp. 22-30.

V. Pauli et al., "Heterogeneous LTE Networks and Inter-Cell Interference Coordination", White Paper, Nomor Research, 2010, 9 pgs.

"Performance Study on ABS with Reduced Macro Power", Panasonic, 3GPP TSG-RAN WG1 Meeting #67, R1-113806, Nov. 2011, 9 pgs.

"On PDCCH enhancements for CA based HetNet", 3GPP TSG-RAN WG1 #68, R1-12—63, Feb. 2012, 5 pgs.

\* cited by examiner

US 8,989,112 B2

EICIC CARRIER AGGREGATION USING EXTENSION CARRIERS

TECHNICAL FIELD

This invention relates generally to wireless networks and, more specifically, relates to carrier aggregation in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

ABS Almost-Blank Subframes
AWT Alternate Wireless Technology
dB decibels
CRS Common Reference Signal
dB decibels
DL DownLink (from base station to user equipment)
DMRS Demodulation Reference Signal
EESM Exponential Effective SIR Mapping
eICIC enhanced Interference Control Interference Coordination
eNB or eNode B evolved Node B (LTE base station)
ePDCCH Enhanced Physical Downlink Control CHannel
HetNet Heterogeneous Network
LPS Low-Power Subframe
LTE Long Term Evolution
MCS Modulation and Coding Scheme
MIB Master Information Block
MME Mobility Management Entity
NCE Network Control Element
OFDM Orthogonal Frequency Division Multiplex
PCC Primary Component Carrier
PDCCH Physical Downlink Control CHannel
PDSCH Physical Downlink Shared Channel
RB resource block
Rel Release
RSRP Reference Signal Received Power
SCC Secondary Component Carrier
SGW Serving GateWay
SINR Signal to Interference plus Noise Ratio
SIR Signal to Interference Ratio
SON Self Optimizing Network
UE User Equipment HetNet (e.g., AWT) is increasingly being used, e.g., to increase capacity in certain areas. HetNet typically involves adding additional access points within a macro cell where the access points form smaller cells that "underlay" the macro cell. That is, the additional access points form cells having smaller coverage than the macro cell, but can provide, e.g., additional capacity within that smaller coverage. Thus, with HetNet, the number of sites increases dramatically and each site has a smaller footprint (e.g., relative to a macro cell).

The underlying cells and their corresponding base stations have names that correspond to the size of the coverage. For instance, a pico cell typically has a larger coverage than does a femto cell. Common names used for these smaller cells include (in order of coverage from larger to smaller) micro, pico, and femto cells. In addition to these smaller cells, there are also relay cells. Relay cells decode and store information received wirelessly, and forward the information wirelessly to user equipment (or vice versa, from the user equipment to the base station).

In HetNet, cell range extension can be used to offload more UEs to a pico cell even though a UE has better SINR to a macro cell. In cell range extension, a biasing parameter is used so that more UEs connect to, e.g., a pico cell. However, there are problems with cell range extension for HetNet.

SUMMARY

This section contains examples of possible implementations and is not meant to be limiting.

In an exemplary embodiment of one aspect, a method is disclosed that includes, for a transmission by a first base station of a first set of aggregated carriers including a primary component carrier having a first carrier frequency and a second component carrier having a second carrier frequency, wherein the first and second carrier frequencies are different, transmitting on the second component carrier a subframe having a number of selected symbols of the subframe at a lower power than other symbols of the subframe. The number of selected symbols aligns at least in part with a number of symbols of a control region of a subframe transmitted by a second base station on a primary component carrier having the second carrier frequency. A second set of aggregated carriers is formed by the primary component carrier along with a secondary component carrier having the first carrier frequency. The first and second sets of aggregated carriers are to be transmitted contemporaneously by the respective first and second base stations.

In a further exemplary embodiment, an exemplary apparatus includes one or more processors and one or more memories including computer program code. The one or more memories and the computer program code are configured to, with the one or more processors, cause the apparatus to perform at least the following: for a transmission by a first base station of a first set of aggregated carriers including a primary component carrier having a first carrier frequency and a second component carrier having a second carrier frequency, wherein the first and second carrier frequencies are different, transmitting on the second component carrier a subframe having a number of selected symbols of the subframe at a lower power than other symbols of the subframe, wherein the number of selected symbols aligns at least in part with a number of symbols of a control region of a subframe transmitted by a second base station on a primary component carrier having the second carrier frequency, wherein a second set of aggregated carriers is formed by the primary component carrier along with a secondary component carrier having the first carrier frequency, and wherein the first and second sets of aggregated carriers are to be transmitted contemporaneously by the respective first and second base stations.

An exemplary computer program product includes a computer-readable medium bearing computer program code embodied therein for use with a computer, the computer program code including: code, for a transmission by a first base station of a first set of aggregated carriers including a primary component carrier having a first carrier frequency and a second component carrier having a second carrier frequency, wherein the first and second carrier frequencies are different, for transmitting on the second component carrier a subframe having a number of selected symbols of the subframe at a lower power than other symbols of the subframe, wherein the number of selected symbols aligns at least in part with a number of symbols of a control region of a subframe transmitted by a second base station on a primary component carrier having the second carrier frequency, wherein a second set of aggregated carriers is formed by the primary component carrier along with a secondary component carrier having the first carrier frequency, and wherein the first and second sets of aggregated carriers are to be transmitted contemporaneously by the respective first and second base stations.

An additional exemplary embodiment includes an apparatus comprising: means, for a transmission by a first base station of a first set of aggregated carriers including a primary component carrier having a first carrier frequency and a second component carrier having a second carrier frequency, wherein the first and second carrier frequencies are different, for transmitting on the second component carrier a subframe having a number of selected symbols of the subframe at a lower power than other symbols of the subframe, wherein the number of selected symbols aligns at least in part with a number of symbols of a control region of a subframe transmitted by a second base station on a primary component carrier having the second carrier frequency, wherein a second set of aggregated carriers is formed by the primary component carrier along with a secondary component carrier having the first carrier frequency, and wherein the first and second sets of aggregated carriers are to be transmitted contemporaneously by the respective first and second base stations.

In another aspect, a method is disclosed that includes: receiving at least control information by accessing a first carrier frequency on a primary component carrier of a first set of aggregated carriers transmitted by a first base station, wherein the first set of aggregated carriers also comprises a secondary component carrier having a second carrier frequency, wherein the first and second carrier frequencies are different; and receiving data by accessing the second carrier frequency on a primary component carrier of a second set of aggregated carriers transmitted by a second base station, wherein the second set of aggregated carriers also comprises a secondary component carrier having the first carrier frequency, wherein the first and second sets of aggregated carriers are transmitted contemporaneously by the respective first and second base stations.

An exemplary apparatus includes one or more processors and one or more memories including computer program code. The one or more memories and the computer program code are configured to, with the one or more processors, cause the apparatus to perform at least the following: receiving at least control information by accessing a first carrier frequency on a primary component carrier of a first set of aggregated carriers transmitted by a first base station, wherein the first set of aggregated carriers also comprises a secondary component carrier having a second carrier frequency, wherein the first and second carrier frequencies are different; and receiving data by accessing the second carrier frequency on a primary component carrier of a second set of aggregated carriers transmitted by a second base station, wherein the second set of aggregated carriers also comprises a secondary component carrier having the first carrier frequency, wherein the first and second sets of aggregated carriers are transmitted contemporaneously by the respective first and second base stations.

An exemplary computer program product includes a computer-readable medium bearing computer program code embodied therein for use with a computer, the computer program code including: code for receiving at least control information by accessing a first carrier frequency on a primary component carrier of a first set of aggregated carriers transmitted by a first base station, wherein the first set of aggregated carriers also comprises a secondary component carrier having a second carrier frequency, wherein the first and second carrier frequencies are different; and code for receiving data by accessing the second carrier frequency on a primary component carrier of a second set of aggregated carriers transmitted by a second base station, wherein the second set of aggregated carriers also comprises a secondary component carrier having the first carrier frequency, wherein the first and second sets of aggregated carriers are transmitted contemporaneously by the respective first and second base stations.

Another exemplary embodiment includes an apparatus including means for receiving at least control information by accessing a first carrier frequency on a primary component carrier of a first set of aggregated carriers transmitted by a first base station, wherein the first set of aggregated carriers also comprises a secondary component carrier having a second carrier frequency, wherein the first and second carrier frequencies are different; and means for receiving data by accessing the second carrier frequency on a primary component carrier of a second set of aggregated carriers transmitted by a second base station, wherein the second set of aggregated carriers also comprises a secondary component carrier having the first carrier frequency, wherein the first and second sets of aggregated carriers are transmitted contemporaneously by the respective first and second base stations.

DETAILED DESCRIPTION OF THE DRAWINGS

Figure 1:
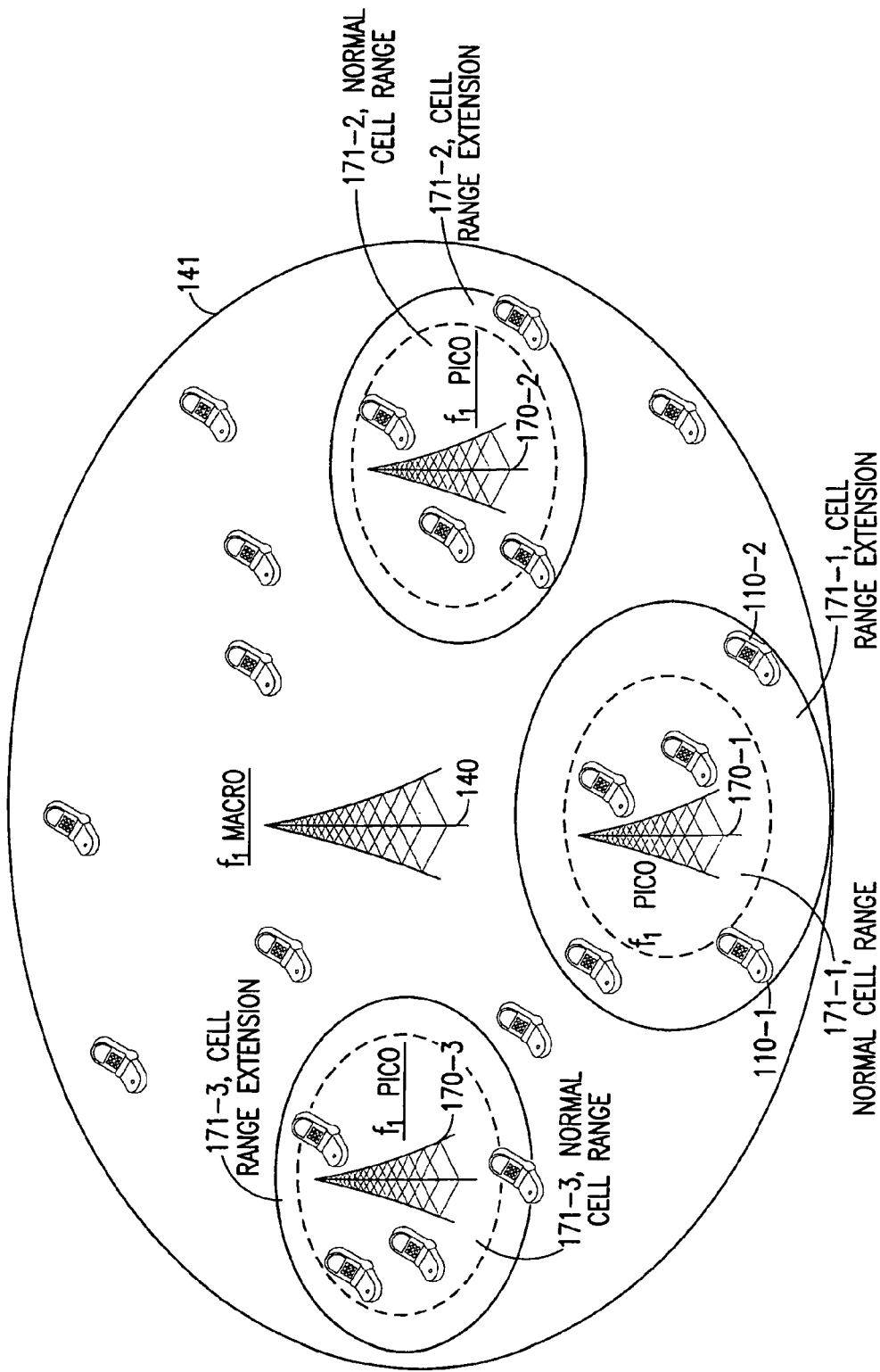
FIG. 1 illustrates cell range extension.

As stated above, there are problems with cell range extension for HetNet. These problems are now described in more detail. In a HetNet, a mixture of lower-power nodes (e.g. macro/pico/femto/relay) cells is deployed. Typically, a macro cell has 25-30 dB gain in DL signal strength (RSRP) compared to low power nodes for the same path loss due to higher transmit power and antenna gain for the macro cell. To allow more users to attach to low power nodes, cell-selection biasing can be used. This is illustrated in FIG. 1. FIG. 1 shows a number of user equipment 110 within the confines of a macro cell 141, which is formed by a base station (e.g., eNB) 140. Also shown are three pico cells 171-1, 171-2, and 171-3, each of which is formed by a corresponding base station (e.g., eNB) 170-1, 170-2, and 170-3. It is noted that the macro base station 140 and pico base stations 170 are each using a carrier having a carrier frequency of $f_1$.

Each of the pico cells 171 use cell-selection biasing to increase the effective coverage of the corresponding cell from the normal cell range to the range created by cell range extension. This method is called cell range extension and can increase overall system throughput as users are offloaded to lower-power (relative to the macro) nodes. Typically, the user equipment 110 are provided with a value to add to a value corresponding to the quality of the signal for the corresponding pico cell 171. For instance, if the user equipment 110 is using RSRP or SINR, then whatever the RSRP or SINR is for the corresponding pico cell 171, the user equipment adds a value to the RSRP or SINR. This increases the RSRP or SINR value used to determine whether the user equipment should attach to the macro cell 141 or the pico cell 171 and therefore increases the effective coverage area of the corresponding pico cell 171 is increased. This is shown in FIG. 1 by the "normal cell range" (without cell-selection biasing) and "cell range extension" (with cell-selection biasing) indications.

With cell range extension, however, UEs 110 in the cell range extension zone are not connected to the best DL cell. Two of these UEs 110-1 and 110-2 are illustrated in FIG. 1. As a result, these UEs 110 suffer high interference from the macro cell 141. This high interference is especially harmful to the control channel. Thus, UEs 110 in the cell range extension zone may not be able to reliably receive the control channel (e.g., PDCCH). This also makes them unable to receive the data channel, since data channel assignment is given by the control channel.

Figure 2:
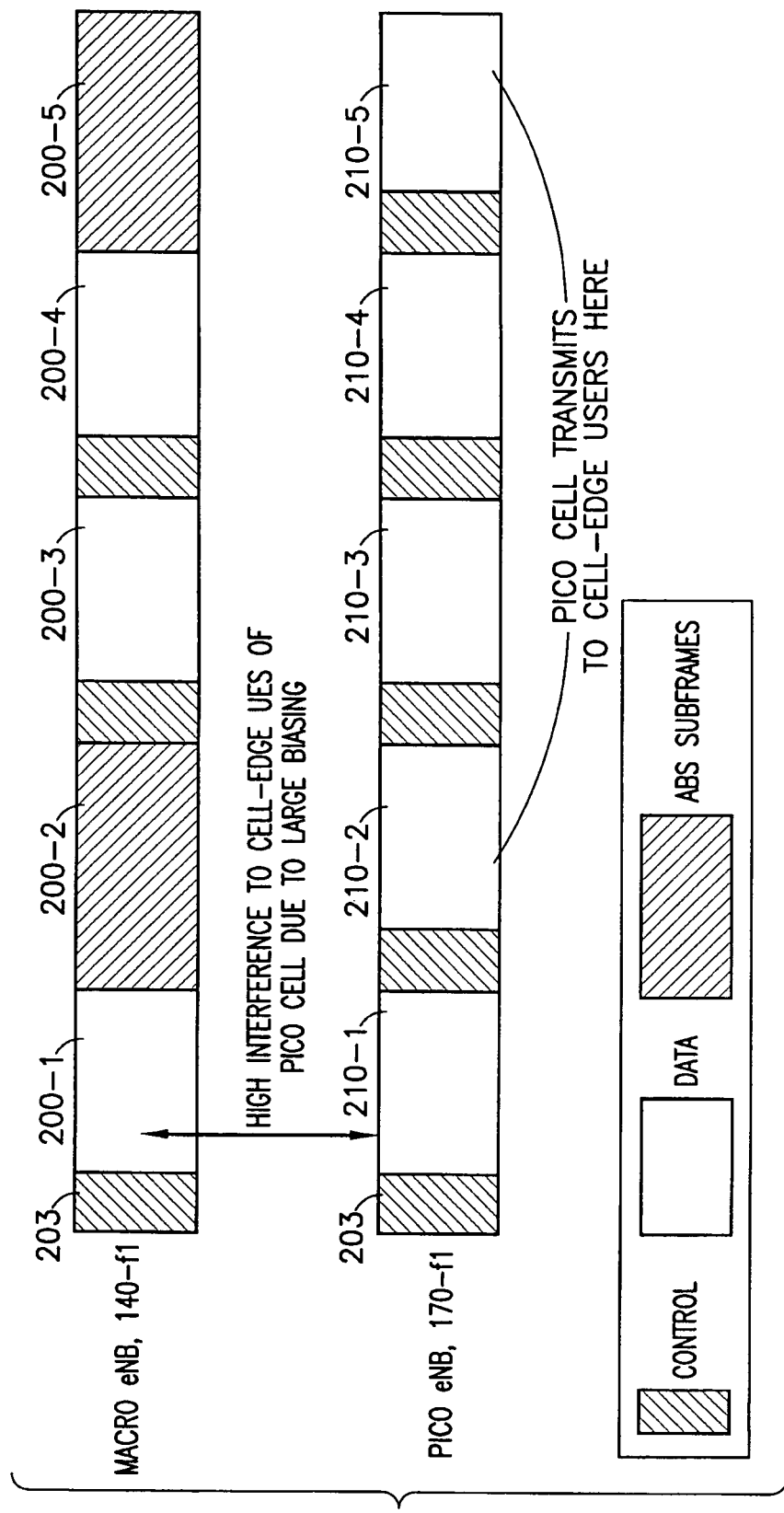
FIG. 2 is an example of the use of ABS subframes to reduce interference between macro and pico cells.

To mitigate this problem, eICIC concepts such as Almost-Blank Subframes (ABS), CRS cancellation, and subframe offsetting have been introduced. FIG. 2 shows an example using ABS subframes. In this example, both the macro eNB 140 and the pico eNB 170 transmit using the carrier frequency $f_1$. The macro eNB 140 transmits subframes 200-1 through 200-5, and the pico eNB 170 transmits subframes 210-1 to 210-5, and these sets of subframes are substantially aligned in the time domain. The subframes 200-1, 200-3, 200-4, and 210-1 through 210-5 include both control 203 and data 205 sections. The subframes 200-2 and 200-5 are ABS subframes, and the pico cell correspondingly transmit to cell edge users using subframes 210-2 and 210-5, which coincide in the time domain with the ABS subframes 200-2 and 200-5.

However, all these techniques result in a loss of capacity or the need for complicated and costly receivers. For instance, with ABS, a macro eNB can lose up to 50 percent of its capacity. FIG. 2 shows a 40 percent loss. A smaller but still significant loss occurs if LPS is used. In addition, the ABS pattern is managed, e.g., by a SON server which adds complexity to the network.

Figure 3:
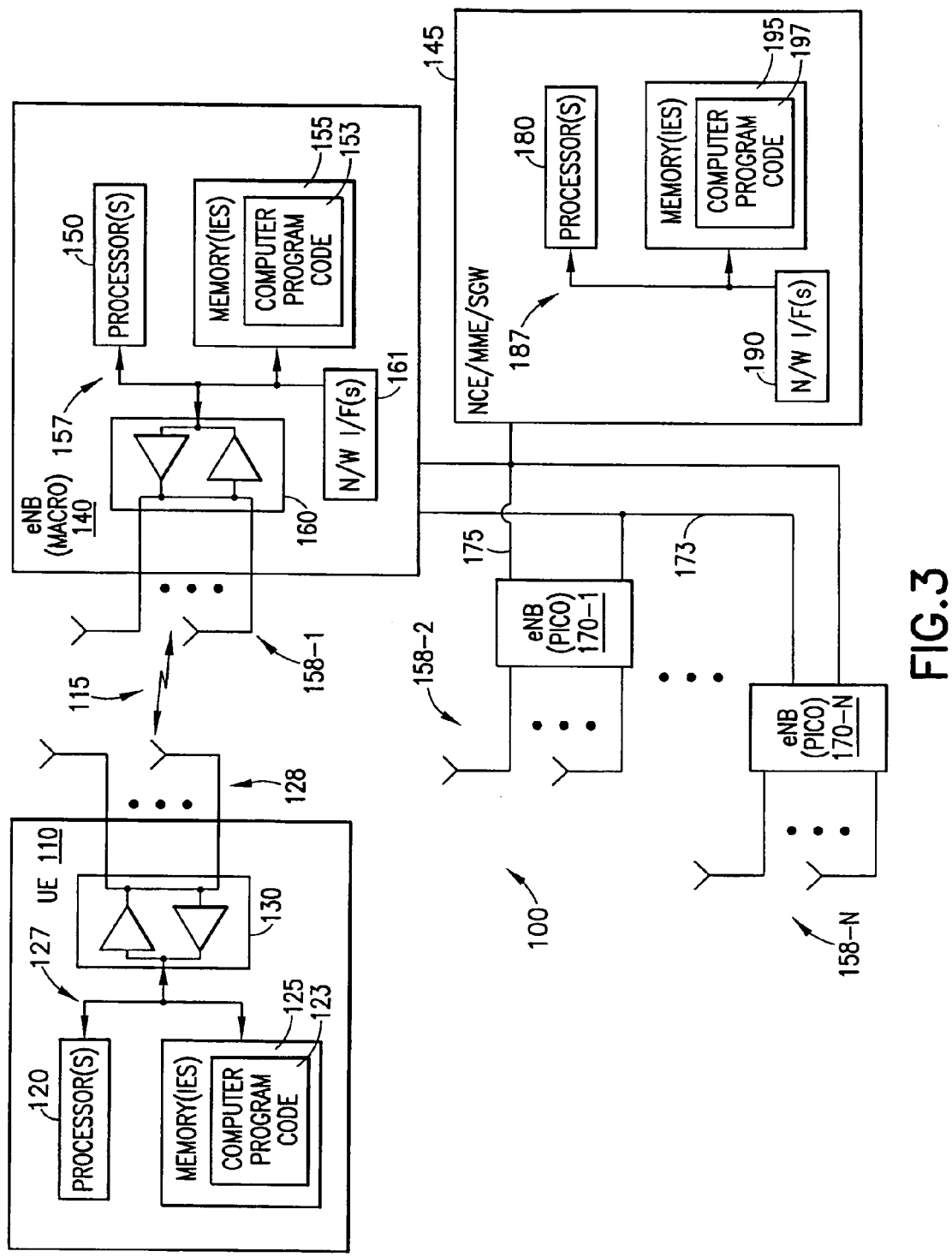
FIG. 3 illustrates an exemplary system in which the exemplary embodiments of the instant invention may be practiced.

The instant exemplary embodiments reduce or solve these problems. Description of the exemplary embodiments occurs after an exemplary system in which the invention may be practiced is described. Turning to FIG. 3, this figure illustrates a block diagram of an exemplary system in which the instant invention may be practices.

FIG. 3 illustrates an exemplary system in which the exemplary embodiments of the instant invention may be practiced. In FIG. 3, a user equipment (UE) 110 is in wireless communication through a link 115 with a wireless network 100. Although only one UE is shown in FIG. 3, there could be many UEs 110, as shown in FIG. 1. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The wireless network 100 includes eNodeBs (eNBs) 140 and 170-1 to 170-N and a network control element (NCE) 145 that may include MME/SGW functionality. The internal elements of eNodeB 140 will be described herein, and it is assumed the eNodeBs 170-1 through 170-N are similar. The eNodeB 140 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNodeB 140 (or 170) to perform one or more of the operations as described herein. The one or more network interfaces 161 communicate over networks such as the networks 173, 175.

The NCE 145 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the NCE 145 to perform one or more of the operations as described herein. The one or more network interfaces 190 communicate over networks such as the networks 173, 175.

The eNodeBs 140, 170 communicate using, e.g., network 173. The network 173 may be wired or wireless or both and may implement, e.g., an X2 interface. The NCE 145 uses the network 175 to communicate with the eNodeBs 140, 170. The network 175 may be wired or wireless or both and may implement, e.g., a Type 1 or Type 2 interface.

The macro eNodeB 140 forms the macro cell 141, and the pico eNodeB 170 forms the pico cell 171. It should be noted that operations herein may be described as being performed by a cell. It should be understood that the operations are performed by the corresponding base station, e.g., eNodeB 140 or 170.

The computer readable memories 125, 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150 and 180 may be of any type suitable to the local technical environment, and may include one or more of general purpose computers, special purpose computers, microprocessors, digital signal processors (DSPs) and processors based on a multi-core processor architecture, as non-limiting examples.

Exemplary embodiments of the instant invention provide for performing eICIC with carrier aggregation and extension carrier that significantly increase macro eNB capacity over using ABS/LPS.

One aspect of the invention concerns extension carriers. The extension carrier is called a "new carrier type" (NCT), and the technical standards concerning the same are still being written. A new carrier type is a downlink channel that is characterized by a lack of common channels including PDCCH, MICH (physical hybrid indicator channel), PBCH (physical broadcast channel), and PCFICH (physical control format indicator channel), and reduced common signals including CRS (common reference signal). Instead, the new carrier type contains the PDSCH and a new control channel, ePDCCH. In Rel-11, the new carrier type must be deployed as secondary component carrier as part of a carrier aggregation system where a traditional carrier will act as the primary component carrier. In future releases, the new carrier type may become a standalone carrier. Herein, this carrier is called an "extension carrier" or a "secondary carrier". Extension carriers do not have Rel-10 control channels associated with them. For instance, the PDCCH is a control channel that typically takes up a portion (e.g., one or several OFDM symbols in the time domain and 12 subcarriers in the frequency domain) of the subframe. In an example, HetNet is deployed with carrier aggregation such that Rel-10 control channels are on different carriers. An example of this is shown in FIG. 4.

Figure 4:
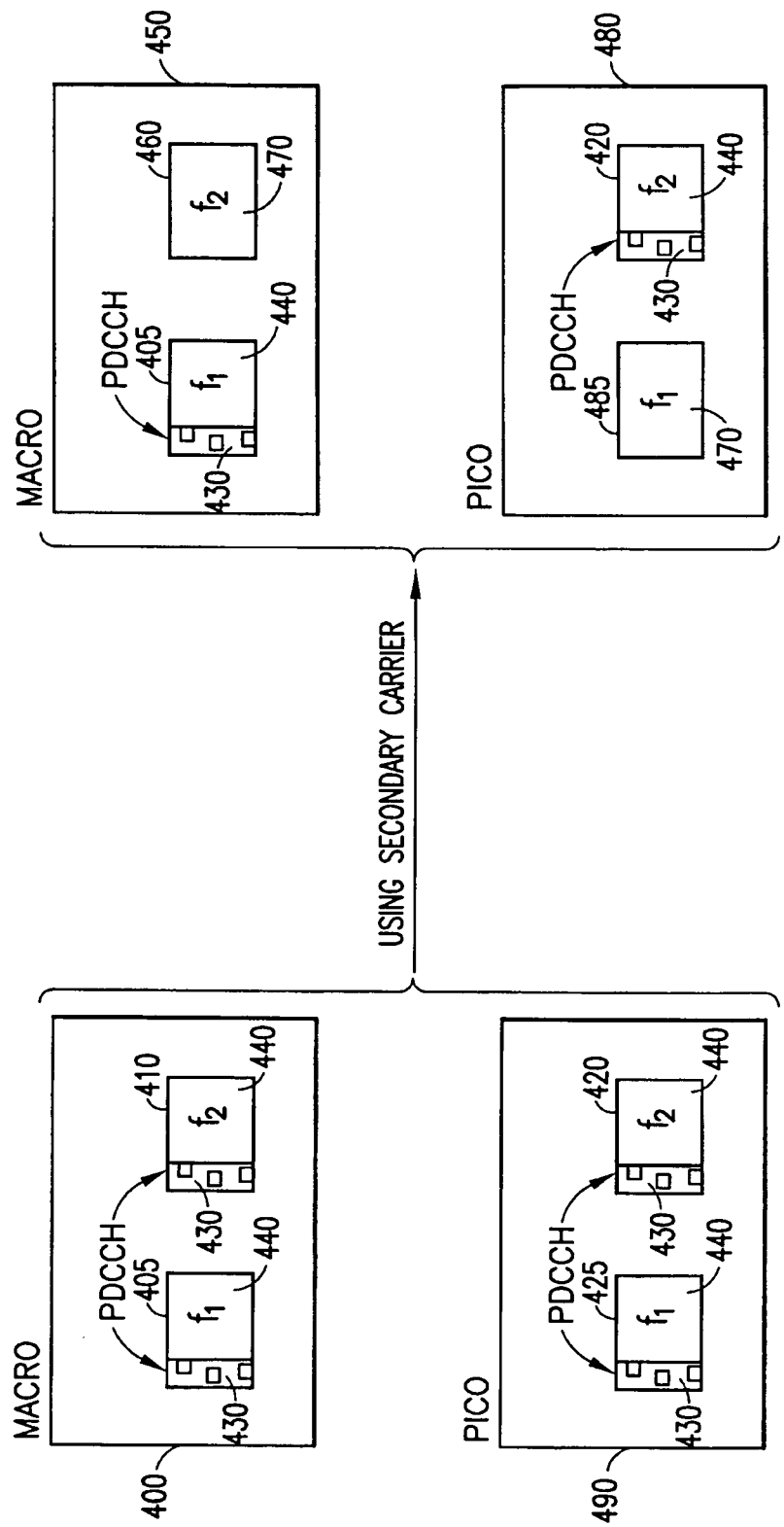
FIG. 4 is an example showing carrier aggregation with and without secondary carriers in a HetNet scenario.

FIG. 4 shows a typical scenario without secondary carriers on the left side, where aggregated carriers 400 (transmitted in the macro cell 141 by eNB 140) and 420 (transmitted in the pico cell 171 by eNB 170) are shown. The aggregated carriers 400 include a subframe 405 transmitted over carrier frequency $f_1$, and a subframe 410 transmitted over carrier frequency $f_2$. Each of the subframes 405, 410 includes a control region 430 (shown as PDCCH) and a data region 440. Aggregated carriers 490 include a subframe 425 transmitted over carrier frequency $f_1$, and a subframe 420 transmitted over carrier frequency $f_2$. Each of the subframes 425, 420 includes a control region 430 (shown as PDCCH) and a data region 440. The aggregated carriers 400 and 420 (and their corresponding subframes) are sent contemporaneously.

Using secondary carriers, this becomes the scenario illustrated on the right side, where aggregated carriers 450 (transmitted in the macro cell 141 by macro eNB 140) and 480 (transmitted in the pico cell 171 by the pico eNB 170) are shown. The aggregated carriers 450 include a subframe 405 transmitted over carrier frequency $f_1$ (the primary component carrier, PCC), and a subframe 460 transmitted over carrier frequency $f_2$ (the secondary component carrier, SCC). The subframe 405 includes a control region 430 (shown as PDCCH) and a data region 440. Aggregated carriers 480 include a subframe 485 transmitted over carrier frequency $f_1$ (the secondary component carrier, SCC), and a subframe 420 transmitted over carrier frequency $f_2$ (the primary component carrier, PCC). The subframe 420 includes a control region 430 (shown as PDCCH) and a data region 440. However, the subframes 460 and 485 do not include a control region 430 and instead only include a data region 470. The aggregated carriers 450 and 480 (and their corresponding subframes) are sent contemporaneously. It can be seen that transmission in the subframe 460 in the macro cell 141 by the eNB 140 can create high interference (in subframe 420) to cell edge user equipment 110 of the pico cell due to large biasing to create the cell range extension described in reference to FIG. 1. That is, the cell edge user equipment 110 in the cell range extension area are connected to the pico cell 171 even though the power of transmission of the pico cell 171 (e.g., eNB 170) may be much smaller than the power of the transmission of macro cell 141 (e.g., eNB 140).

Figure 5:
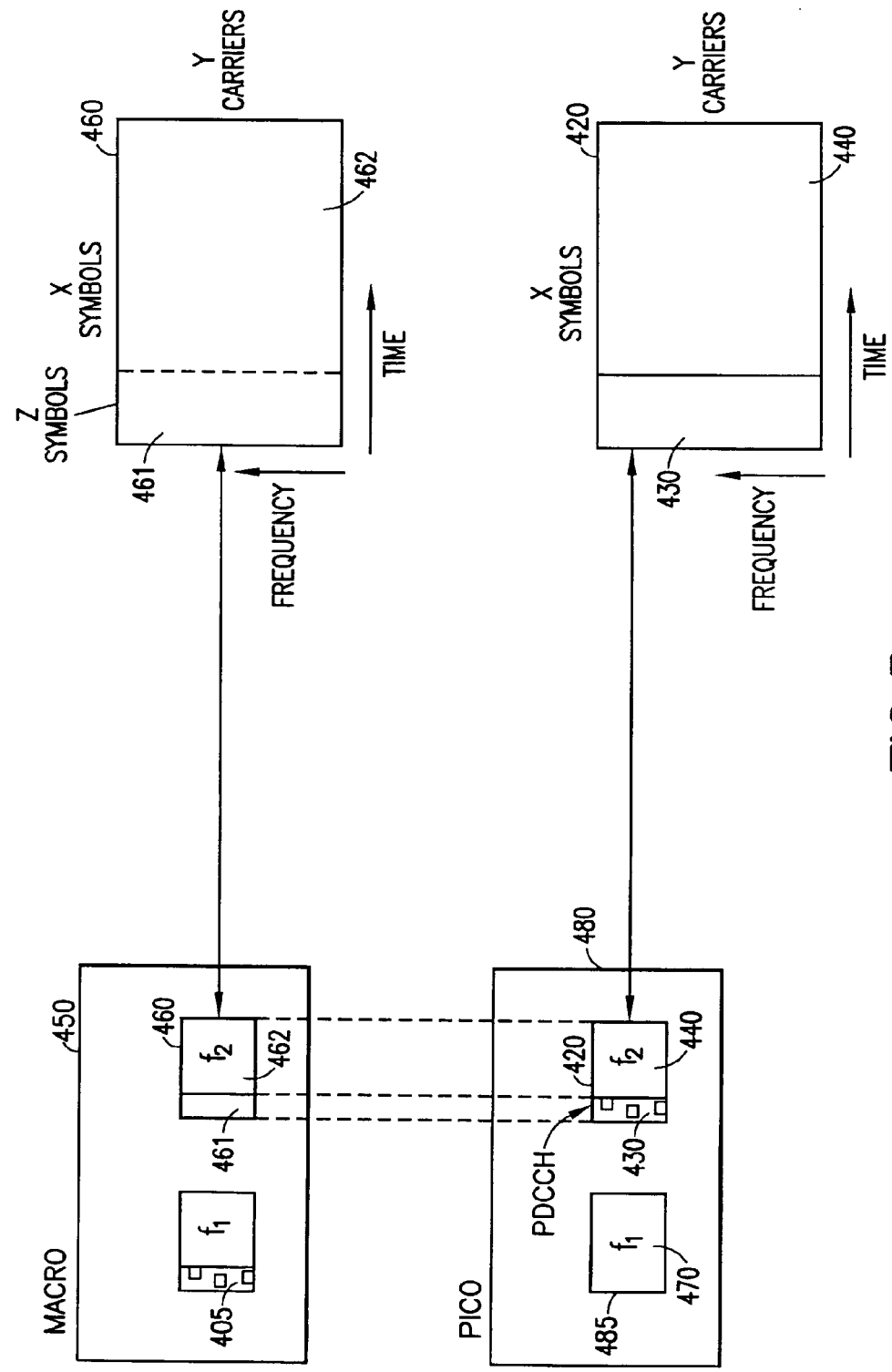
FIG. 5 is an example showing carrier aggregation with secondary carriers in a HetNet scenario in accordance with an exemplary embodiment.

An illustration of an example of a solution for at least the control region 430 of subframe 420 for the pico cell 171 is shown in FIG. 5. This figure shows a revised version of the aggregated carriers 450, 480 from FIG. 4. Also shown are an LTE physical resource (e.g., the PDSCH) in downlink, which includes X symbols in the time domain and Y carriers in the frequency domain. A common configuration is 14 OFDM symbols (two time slots) in the time domain and 12 OFDM subcarriers in the frequency domain. In this revised version, the first few (e.g., "Z") symbols (in region 461 of the subframe 460) of the PDSCH (illustrated as subframe 460) are transmitted from the macro-cell on the SCC at a lower power (e.g., a fractional power reduction relative to a normal power). This is possible on an extension carrier (SCC) since only DMRS is used. The UE knows the pilot-to-data power ratio between DMRS and PDSCH so there is no issue with power reduction. The region 461 aligns in time with at least a part of and typically all of the control region 430 of the subframe 420 transmitted in the pico cell 171 by the pico eNB 170. The region 462 of the subframe 460 is transmitted at a normal power.

Figure 6:
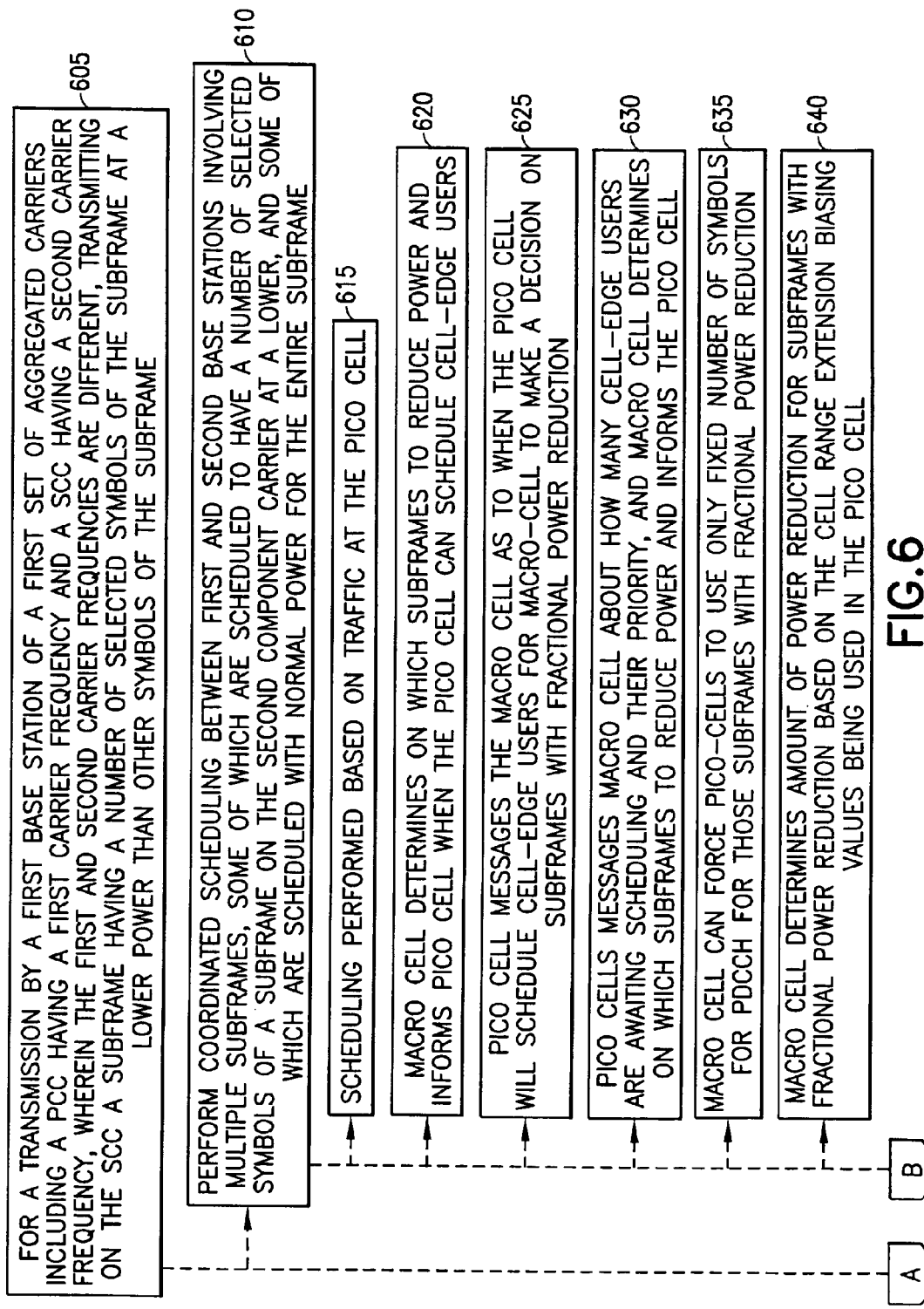
FIG. 6 is a block diagram of a flowchart performed by a network entity (e.g., base station, or site-level pooling node) for carrier aggregation using extension carriers.
Figure 6:
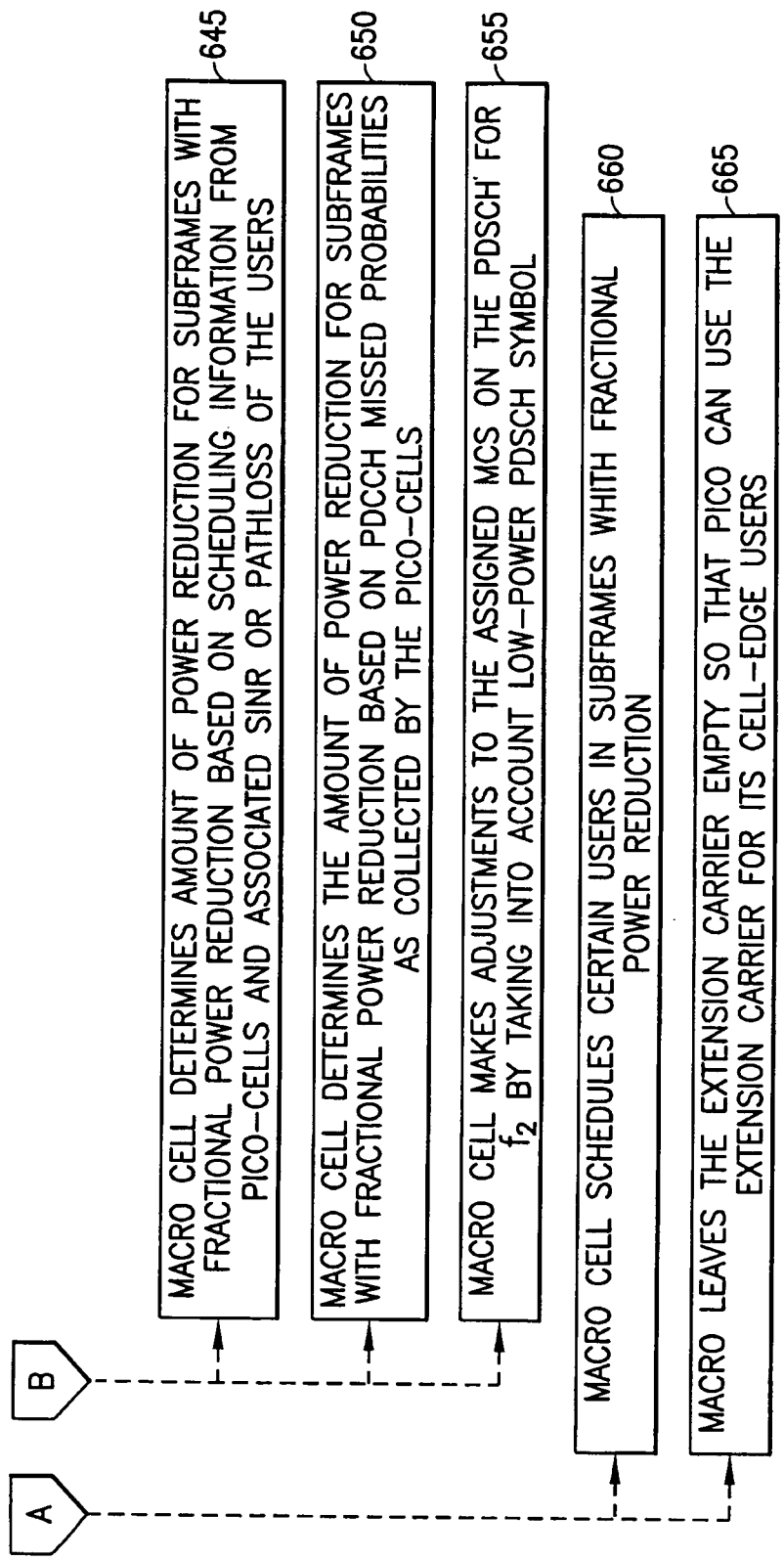

Turning to FIG. 6, a block diagram is shown of a flowchart performed by a network entity (e.g., base station, or site-level pooling node) for carrier aggregation using extension carriers. In block 605, for a transmission by a first base station of a first set of aggregated carriers (e.g., 450) including a PCC having a first carrier frequency and a SCC having a second carrier frequency, wherein the first and second carrier frequencies are different, a transmission is performed on the SCC of a subframe having a number of selected symbols of the subframe at a lower power than other symbols of the subframe. As described above in reference to FIG. 5, the number of selected symbols (e.g., in region 461) align at least in part with a number of symbols of a control region (e.g., 430) of a subframe (e.g., 420) transmitted by a second base station on a PCC having the second carrier frequency. A second set of aggregated carriers (e.g., 480) is formed by the PCC along with a SCC having the first carrier frequency. Examples of how block 605 might be performed are illustrated by blocks 610 through 665.

In an additional example using the technique illustrated in FIG. 5, a macro cell 141 determines which subframes to perform fractional power reduction using either a predetermined pattern or dynamically with coordinated scheduling (block 610). For instance, the dynamic determination may be based on traffic at the pico cell 171 (block 615). If the pico cell is heavily loaded (i.e., has lots of traffic), the macro cell can arrange for more subframes with lower symbol power (and vice versa). It can also be that only cell-edge traffic is considered, but this is more complicated as cells normally do not keep this kind of statistic.

Regarding coordinated scheduling (block 610), the following are examples of such coordination:

1) The macro cell 141 determines (block 620) when to reduce power and informs the pico cell 171 when the pico cell 171 can schedule cell-edge users (e.g., users with SINR or path gain below a threshold). As an example, the macro cell will inform the pico cell that the pico cell can schedule cell-edge users in the next subframe. The pico cell will then schedule cell-edge users, defined as users with SINR or path-gain below a threshold, in the next subframe. The pico cell can also schedule non cell-edge users of course.

2) Pico cells 171 pass along (e.g., message) information indicating when the pico cells 170 will schedule cell-edge users (e.g., user equipment 110), and the macro cell 141 uses this information to make a decision on fractional power reduction. See block 625. This is the opposite of the previous example. Here, the pico-cell determines when to schedule cell-edge users. The pico cell then informs the macro cell of this decision, then for those subframes the macro cell will implement power reduction on the symbols corresponding to the PDCCH on the pico-cell. This approach gives priority to the pico-cell, whereas the previous approach gives priority to the macro-cell.

3) Pico cells 171 pass (e.g., message) information to the macro cell 141 about how many cell-edge users are awaiting scheduling and their priority, the macro cell 141 determines when to reduce power and then the macro cell 141 informs the pico cells 171 of this or these periods. See block 630. For instance, a pico cell informs the macro cell of the number and priority of cell-edge users. The macro cell uses this information relative to its own scheduling load to determine when the macro cell will reduce its own transmission power. For example, if macro cell is lightly loaded, the macro cell can reduce its transmission power for the next K subframes to allow the pico cell to schedule cell-edge users, where K is dependent on the number of cell-edge users at pico cells. As another example, if the macro cell is heavily loaded, the macro cell can sort its own users and cell-edge users from the pico-cell based on priority. Then, as cell-edge users from the pico-cell are selected, then macro cell will lower its transmission power.

Additionally, with coordinated scheduling, the macro cell 141 can dynamically change the number of low-power PDSCH symbols in $f_2$ (the SCC) and also the amount of power reduction. Examples of this include the following non-limiting techniques:

1) The macro cell 141 can force pico cells 171 to use only a fixed number of symbols for PDCCH (e.g., so the number of symbols in the region 461 of the subframe 460 are the same as the number of symbols in the control region 430 of the subframe 420, only for those subframes with lower power (for other subframes, the number of symbols in the region 461 of the subframe 460 are not fixed). See block 635. Thus, the macro cell informs the pico cell how many symbols to use. The pico cell then has the capability to restrict the PDCCH to use only that many symbols. The capability to restrict the PDCCH to use only that many symbols is a built-in functionality in 3GPP.

2) The amount of power reduction can be determined based on the cell range extension biasing values being used in the pico cells. See block 640. An example of a formula for this is as follows:

$$P\_reduction = \alpha * Bias + \beta,$$

where $\alpha$ and $\beta$ are constants>0 (greater than zero), and Bias is a biasing value. So here, the greater the bias, the greater the power reduction.

3) The amount of power reduction can be determined based on scheduling information from the pico cells 171 and the associated SINR or pathloss of the users connected to the pico cells 171. See block 645. Scheduling information concerns which users are being scheduled in this subframe. This allows for dynamic determination of the power reduction. For example, if the pico cell is scheduling a user with high pathloss (or low SINR), then the power reduction will be higher.

4) The amount of power reduction (see block 650) can be determined based on PDCCH missed probabilities as collected by the pico cells 171. A PDCCH missed probability is the probability that the PDCCH was sent, but the UE did not correctly receive the PDCCH. This is determined from the fact that the UE did not send an acknowledgement for the data packet. More specifically, the pico cell sends PDCCH telling the UE that there is data packet for PDCCH. The UE decodes the data packet and sends back acknowledgement (ACK/NACK). If the UE did not send back ACK/NACK, the pico cell knows the UE has missed the grant (PDCCH). So the UE collects this statistics to determine how severe the interference is to the PDCCH, then adjusts the power reduction amount accordingly.

Figure 7:
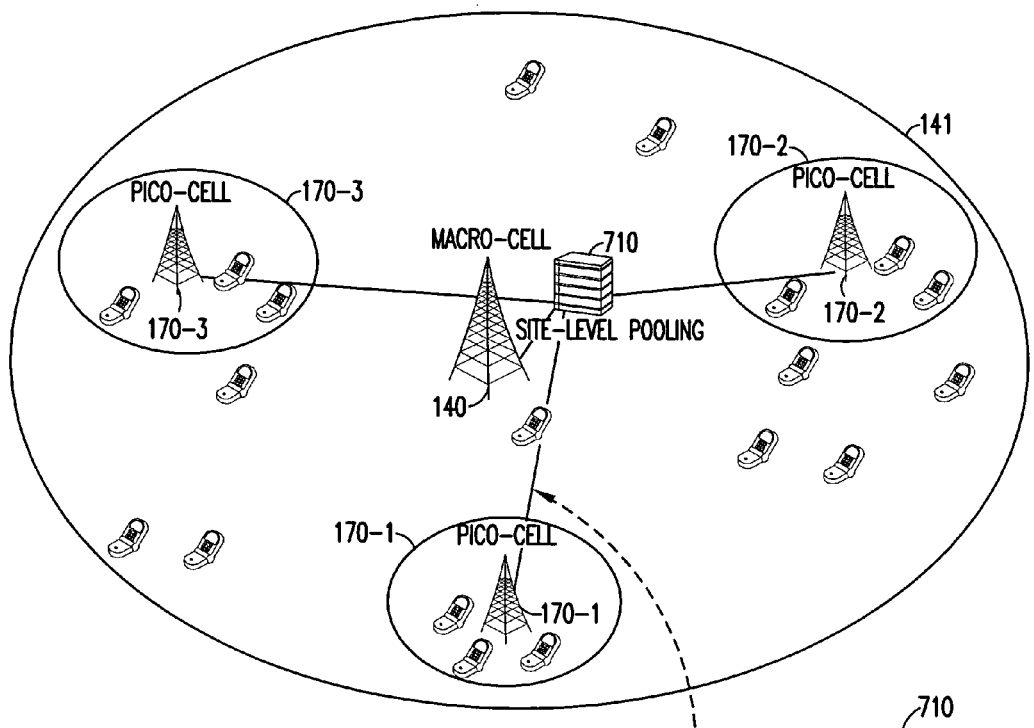
FIG. 7 is an exemplary diagram of messaging in a baseband pooling scenario used for carrier aggregation using extension carriers.

In an example, the messaging described above can be performed via signaling between a macro cell 141 and one or more pico cells 171. In other scenarios, there is centralized network node to which this information may be sent, e.g., via a network such as over link 173. Turning to FIG. 7, for instance, an exemplary diagram is shown of messaging in a baseband pooling scenario used for carrier aggregation using extension carriers. There is a site-level pooling node 710 located, e.g., at the same site at which the eNB 140 is located. Each of the eNB 140 and eNBs 170 communicate via messaging with the site-level pooling node. The pooling and communication may be performed at the baseband level. The exemplary messaging shown in block 710 of FIG. 7 is as follows.

EXAMPLE 1

The pico cells pass along information when the pico cell will schedule cell-edge users (for macro cell to make a decision on fractional power reduction). In response, the macro cell sends indication(s) of scheduling (e.g., which subframes in a frame will have lower power). Here, the signaling likely will be proprietary and can be a bit-map exchange between pico and macro. The bit-map can indicate subframes with reduced power symbols.

EXAMPLE 2

The pico cells pass infointation to the macro cell about how many cell-edge users are awaiting scheduling and their priority (so that the macro cell determines when to reduce power). The Macro cell informs pico cells of scheduling via return messaging.

EXAMPLE 3

The macro cell determines amount of power reduction based on cell range extension biasing values. The biasing can be exchanged between pico and macro using, e.g., the X2 interference. As another example, the biasing can be obtained from a SON server by the macro cell.

EXAMPLE 4

The pico cells send SINR or pathloss (and the macro cell determines the amount of power reduction).

In another aspect of the invention, the macro cell can take dynamic action in order to reduce or minimize the impact of interference on the pico cells (e.g., the cell-edge users in the pico cells), e.g., as an adjunct of coordinated scheduling. For example, the macro cell 140 can make adjustments to the assigned MCS on the PDSCH for $f_2$ (the SCC using for subframe 460 in FIG. 5) by taking into account low power PDSCH symbols (e.g., the reduced power is only for a few symbols and not the entire subframe). See block 655. In this case, the eNB 140 can treat those symbols as lower spectral efficiency symbols and perform combining (e.g., using EESM or MIB) to arrive at the adjusted MCS level for PDSCH in $f_2$. For example, if two symbols are transmitted for PDCCH and the power is reduced by 6 dB in those symbols, the eNB 140 can select MCS-10, instead of selecting MCS-12 that would have been scheduled otherwise.

Another example is to schedule (e.g.) high SINR users in the macro cell in lower-power subframes (e.g., those subframes having a portion at lower power). See block 660. The macro cell 141 can also determine which users (user equipment 110) will not be affected by the power reduction (e.g., users with very high SINR or whose SINR is much better than required for their data rate) and schedule the users in the subframes 460 with fractional power reduction. That is, these users in the macro cell should not be affected by the reduced power in the subframes 460.

An additional example is that the macro cell 141 leaves the extension carrier (carrying the subframe 460) empty so that pico can use the extension carrier for its cell-edge users. See block 660. The macro cell can arrange scheduling decisions so that the SCC (carrying the subframe 460) is empty (i.e., no PDSCH transmission) if the system (e.g., the eNB 140) is lightly loaded, then allow pico cells 171 to use those subframes for cell edge users. For example, the macro cell 141 can hold its transmission if the macro cell 141 does not have data to fill all the RBs in a subframe. Lightly loaded can be determined several ways. Examples include the number of active users in the system, the resource utilization (fraction of resource blocks used), and/or the user queue length. Typically, resource utilization is a good measure of system loading.

In another aspect of the invention, inter-site carrier aggregation can be used for cell-edge user equipment 110 on (e.g., attached to) a pico cell to connect to $f_1$ (e.g., subframe 405) on the macro cell 141 for control, and connect to $f_2$ (e.g., subframe 420) on the pico cell 171 for data. Hence, a user equipment 110 can still receive very high data throughput through the secondary component carrier (extension carrier).

Figure 8:
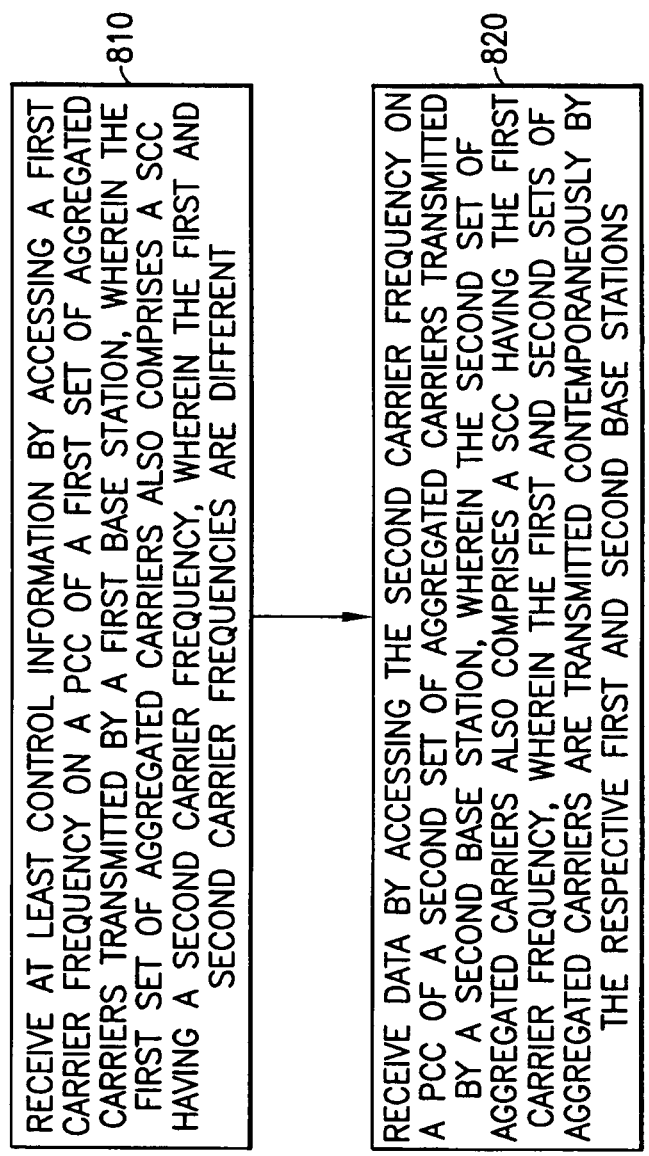
FIG. 8 is a block diagram of a flowchart performed by a UE for inter-site carrier aggregation.

An example of inter-site carrier aggregation is illustrated by FIG. 8, which is a block diagram of a flowchart performed by a UE for inter-site carrier aggregation. In block 810, the user equipment receives at least control information by accessing a first carrier frequency on a PCC of a first set of aggregated carriers transmitted by a first base station, wherein the first set of aggregated carriers also comprises a SCC having a second carrier frequency, wherein the first and second carrier frequencies are different. It is noted that the user equipment can receive only control information on the PCC of the first set of aggregated carriers, or can also receive data on the PCC of the first set of aggregated carriers.

In block 820, the user equipment receives data by accessing the second carrier frequency on a PCC of a second set of aggregated carriers transmitted by a second base station, wherein the second set of aggregated carriers also comprises a SCC having the first carrier frequency. The first and second sets of aggregated carriers are transmitted contemporaneously by the respective first and second base stations.

It is noted that receiving control information typically includes decoding the control information in order to determine which resource elements in a data portion of the second carrier frequency are to be received. Also, receiving data includes accessing at least the determined resource elements in the second carrier frequency. Furthermore, the second base station may not transmit any control information on the primary component carrier of the second set of aggregated carriers.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memory 125, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
for a transmission by a first base station of a first set of aggregated carriers including a primary component carrier having a first carrier frequency and a second component carrier having a second carrier frequency, wherein the first and second carrier frequencies are different, transmitting on the second component carrier a subframe having a number of selected symbols of the subframe at a lower power than other symbols of the subframe,
wherein the number of selected symbols aligns with a number of symbols of a control region of a subframe transmitted by a second base station on a primary component carrier having the second carrier frequency, wherein a second set of aggregated carriers is formed by the primary component carrier along with a secondary component carrier having the first carrier frequency, and
wherein the first and second sets of aggregated carriers are to be transmitted contemporaneously by the respective first and second base stations.

2. The method of claim 1, wherein a cell formed by the second base station is at least partially within a cell formed by the first base station.

3. The method of claim 1, wherein power of a symbol comprises average power computed over all resource elements comprising the symbol.

4. The method of claim 1, wherein the number of symbols of the subframe being transmitted on the second component carrier align at least in part with the number of symbols of the control region of the subframe transmitted by a second base station on the primary carrier, but the number of symbols of the subframe frame being transmitted on the second component carrier do not align with any symbols in a data region of the subframe transmitted by the second base station on the primary carrier.

5. The method of claim 4, further comprising determining, by the first base station, for a plurality of the transmissions of the first set of aggregated carriers, on which of the subframes of the second component carrier for the plurality of transmissions lower power is used on the selected symbols and on which of the subframes of the second component carrier for the plurality of transmissions normal power is used for entire subframes, wherein the determining is performed with coordinated scheduling between the first and second base stations.

6. The method of claim 5, wherein the determining additionally is performed dynamically based on traffic at the second base station.

7. The method of claim 5, further comprising performing the coordinated scheduling at least by the first base station informing the second base station as to an impending future transmission of at least one subframe on which lower power for the selected symbols is to be used.

8. The method of claim 5, further comprising performing the coordinated scheduling at least by the first base station receiving one or more indications from the second base station as to which subframes the second base station will use for cell-edge users, and wherein the first base station uses the indications in the determining to align the subframes of the second component carrier for the plurality of transmissions where lower power is used for the selected symbols in the subframes the second base station will use for cell-edge users.

9. The method of claim 5, further comprising performing the coordinated scheduling at least by the first base station receiving one or more indications from the second base station as to how many cell-edge users are awaiting scheduling and priorities of the cell-edge users, and wherein the first base station uses the indications in the determining on which of the subframes of the second component carrier for the plurality of transmissions lower power is used for the selected symbols and on which of the subframes of the second component carrier for the plurality of transmissions normal power is used for the entire subframe.

10. The method of claim 5, wherein the determining, by the first base station, on which of the subframes of the second component carrier for the plurality of transmissions lower power is used further comprises the first base station configuring via messaging the second base station to use a fixed number of symbols for the control region of the subframes transmitted by a second base station on the primary carrier in order that the fixed number of symbols matches with the number of symbols of the subframe being transmitted by the first base station on the second component carrier at the lower power.

11. The method of claim 5, wherein the determining, by the first base station, on which of the subframes of the second component carrier for the plurality of transmissions having lower power further comprises determining the lower power for the selected symbols for each of the plurality of transmissions by determining an amount of power reduction from a normal power based on a cell range extension value being used by the second base station.

12. The method of claim 5, wherein the determining, by the first base station, on which of the subframes of the second component carrier for the plurality of transmissions having lower power further comprises determining the lower power for the selected symbols for each of the plurality of transmissions by determining an amount of power reduction from the normal power based on scheduling information from the second base station and one or both of associated signal to noise interference ratio or path loss for user equipment scheduled at the second base station.

13. The method of claim 5, wherein the determining, by the first base station, on which of the subframes of the second component carrier for the plurality of transmissions having lower power further comprises determining the lower power for the selected symbols for each of the plurality of transmissions by determining an amount of power reduction from a normal power based on missed probability information collected by and received from the second base station.

14. The method of claim 1, further comprising determining, by the first base station, for a plurality of the transmissions of the first set of aggregated carriers, on which of the subframes of the second component carrier for the plurality of transmissions lower power is used for the selected symbols and on which of the subframes of the second component carrier for the plurality of transmissions normal power is used for the entire subframes, and wherein the determining further comprises scheduling user equipment having signal to interference noise ratios greater than a threshold to receive data using the subframes being transmitted by the first base station on the second component carrier at the lower power for the selected symbols.

15. The method of claim 1, further comprising determining, by the first base station, for a plurality of the transmissions of the first set of aggregated carriers, on which of the subframes of the second component carrier for the plurality of transmissions lower power is used for the selected symbols and on which of the subframes of the second component carrier for the plurality of transmissions normal power is used for the entire subframes, and wherein the determining further comprises determining to transmit a subframe in which zero power is used on the number of symbols and all other symbols in the subframe in response to a determination the first base station has a load that meets a threshold and determining to transmit a subframe in which normal power is used on the number of symbols and all other symbols in the subframe in response to a determination the first base station has a load that does not meet the threshold.

16. A method comprising:
receiving at least control information by accessing a first carrier frequency on a primary component carrier of a first set of aggregated carriers transmitted by a first base station, wherein the first set of aggregated carriers also comprises a secondary component carrier having a second carrier frequency, wherein the first and second carrier frequencies are different, receiving a subframe transmitted on the second component carrier, the subframe having a number of selected symbols of the subframe at a lower power than other symbols of the subframe; and receiving data by accessing the second carrier frequency on a primary component carrier of a second set of aggregated carriers transmitted by a second base station, wherein the number of selected symbols aligns with a number of symbols of a control region of a subframe transmitted by a second base station on the primary component carrier having the second carrier frequency, wherein the second set of aggregated carriers also comprises a secondary component carrier having the first carrier frequency, wherein the control information received from the first base station is used to determine the data received from the second base station, wherein the first and second sets of aggregated carriers are transmitted contemporaneously by the respective first and second base stations.

17. The method of claim 16, wherein receiving at least control information is performed so that data is also received by accessing the first carrier frequency on the primary component carrier of the first set of aggregated carriers transmitted by the first base station.

18. The method of claim 16, wherein receiving data is performed so that no control information is received by accessing the second carrier frequency on the primary component carrier of the second set of aggregated carriers transmitted by the second base station.

19. The method of claim 16, wherein the second base station does not transmit any control information on the primary component carrier of the second set of aggregated carriers.

20. The method of claim 16, wherein receiving control information further comprises decoding the control information in order to determine which resource elements in a data portion of the second carrier frequency are to be received, and wherein receiving data further comprises accessing at least the determined resource elements in the second carrier frequency.

21. The method of claim 16, performed by a user equipment and wherein the user equipment is attached to the second base station while performing both the receiving at least the control information and the receiving the data.

22. A apparatus, comprising:
a transmitter for transmitting by a first base station of a first set of aggregated carriers including a primary component carrier having a first carrier frequency and a second component carrier having a second carrier frequency, wherein the first and second carrier frequencies are different, transmitting on the second component carrier a subframe having a number of selected symbols of the subframe at a lower power than other symbols of the subframe,
wherein the number of selected symbols aligns with a number of symbols of a control region of a subframe transmitted by a second base station on a primary component carrier having the second carrier frequency, wherein a second set of aggregated carriers is formed by the primary component carrier along with a secondary component carrier having the first carrier frequency, and
wherein the first and second sets of aggregated carriers are to be transmitted contemporaneously by the respective first and second base stations.

* * * * *